PLURAL CIRCUITS SELECTIVELY GATED TO COMMON BRANCH BY DIODE GATES IN WHICH DIODES ARE EITHER HIGHLY OR SLIGHTLY BACK-BIASED
Filed Aug. 22, 1960
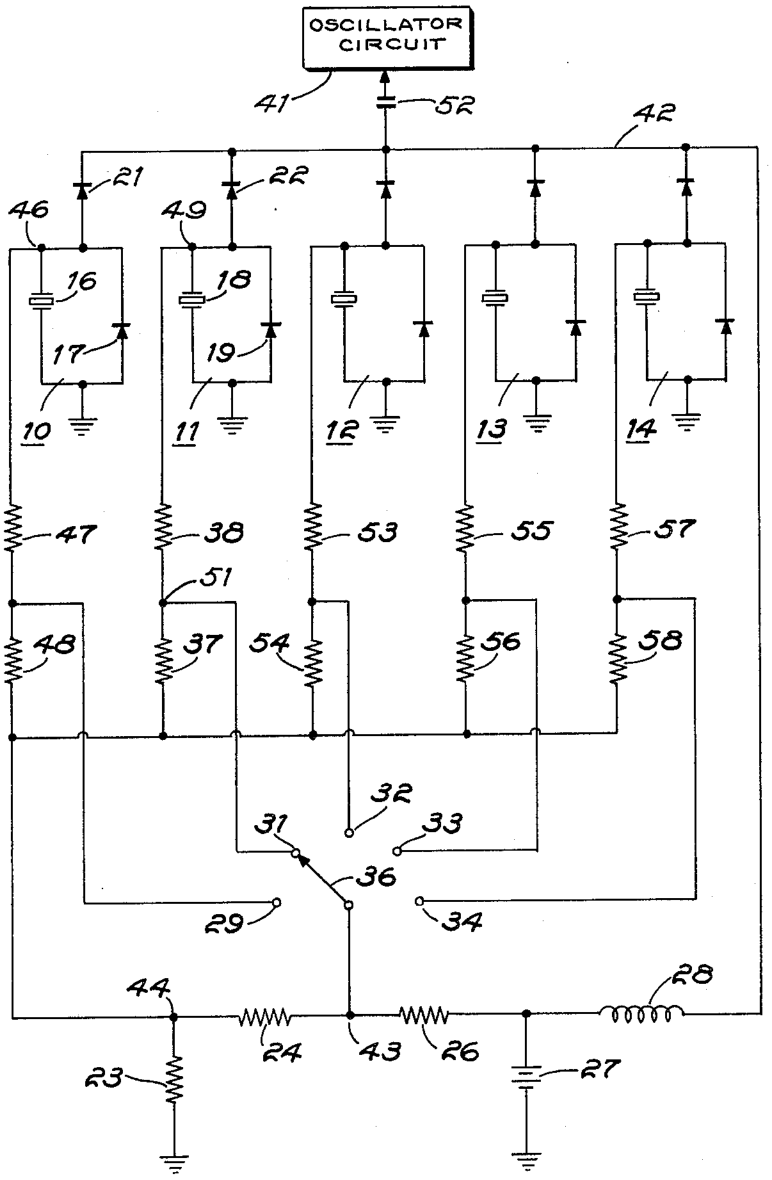
INVENTORS
ALBERT E. ANDERSON
DARRELL E. NEWELL
BY Moody and Phillion
ATTORNEYS 3,167,730
Patented Jan. 26, 1965

3,167,730

PLURAL CIRCUITS SELECTIVELY GATED TO COMMON BRANCH BY DIODE GATES IN WHICH DIODES ARE EITHER HIGHLY OR SLIGHTLY BACK-BIASED

Albert E. Anderson and Darrell E. Newell, Cedar Rapids, Iowa, assignors to Collins Radio Company, Cedar Rapids, Iowa, a corporation of Iowa Filed Aug. 22, 1960, Ser. No. 50,985
6 Claims. (Cl. 334—15)

This invention relates generally to crystal selection means and, more particularly, to a circuit means for selecting one of a group of crystals (or other circuit elements) by the use of diode capacitor means which draw insignificant D.C. current drain and whereby all non-selected crystals will be short-circuited onto themselves so as to produce no harmful change in the impedance presented to the selected crystal.

In the prior art there are known many circuits employing diodes for switching various selected ones of a group of crystals into a given using circuit, such as an oscillator. For example, a plurality of diodes may each have one of their electrodes connected to a common terminal and the other electrode connected to a crystal individual thereto. By selectively biasing the diodes it is possible to cause all but a selected one thereof to become non-operative so that only the crystal associated with the conductive diode will be actively connected to the common terminal and so be utilized in some desired manner in the using circuit. A characteristic of such an arrangement, which is also true of other similar prior art arrangements, is that the crystals not employed, nevertheless, can become active in an undesirable manner in the circuit. Such activity occurs by reason of the fact that ordinarily a certain amount of stray capacitance exists between the terminal lead of the crystal and other parts of the circuit such as, for example, the metal parts near (and connected to) the terminals of the crystal actually selected. In certain applications where the frequency of the non-selected crystals are quite close together the aforementioned stray capacitance may combine with the reactance of the crystal to produce a resultant reactance which will alter, in a harmful manner, the reactance to the selected crystal. More specifically, in most applications the using circuits are designed to present an impedance of about 32 micromicrofarads to a crystal. If such impedance is altered it could result in a change in the operating frequency of a selected crystal. Consequently, it would be desirable to provide means for insuring that the non-selected crystal would not function to change the reactance presented by the using circuit to the selected crystal.

In another prior art structure a first diode is connected in series with each crystal and a second diode is connected in parallel with each crystal. If it is desired to connect the crystal into the using circuit, the first diode is caused to be conductive and the second diode is caused to be non-conductive. In the event that it is desired to isolate the crystal from the using circuit, the first (series) diode is caused to become non-conductive and the second (parallel) diode is caused to become conductive, thus shorting the crystal upon itself as well as isolating it from the using circuit. However, in this prior art circuit one-half of the diodes must be biased in a forward direction at all times, thus presenting a constant drain on the power supply. In many types of electronic circuits both space and conservation of power are of prime importance. Consequently, a structure which will function to isolate all crystals, except the selected crystal, from the principal circuit without producing a constant drain on the power supply constitutes an advance in the art.

In recent years there has been developed a type diode generally known as a diode capacitor which exhibits certain characteristics. Specifically, the characteristic exhibited with which we are concerned in this invention is the fact that the capacitance existing across the diode capacitor will vary inversely as the amount of back-biasing voltage applied thereacross. For example, if a relatively large back-biasing voltage of, for example, 40 or 50 volts is applied across a diode capacitor, the capacitance the diode capacitor will exhibit will be relatively small. However, as the amount of back-biasing potential is decreased the capacitance the diode will exhibit becomes increasingly larger. When the back-biasing potential is decreased to a few tenths of a volt, the capacitance exhibited by the diode may be of the order of 10 times the capacitance exhibited when the back-biasing voltage is 40 or 50 volts. As will be explained in considerable detail later herein, this characteristic of changing capacitance with changing back-biasing potential is employed in one of the more important features of applicant's invention.

An object of the present invention is to provide switching means for selectively switching one of a plurality of crystals into a using circuit and simultaneously insuring that the remaining crystals do not function to produce undesirable effects upon the operation of the selected crystal.

A second aim of the invention is to provide a circuit employing diode switching means for selectively switching one of a plurality of crystals across a given pair of terminals and short-circuiting the non-selected crystals, without producing a constant current drain of the power supply.

A further purpose of the invention is the improvement of crystal switching circuits, generally.

In accordance with the invention, there is provided a battery source and a plurality of switching circuits connected across said battery source. Each of said switching circuits comprises a first diode capacitor and a second diode capacitor connected in series relationship with each other across the terminals of said battery source and a crystal connected across said second diode capacitor means. The diode capacitors are polarized in such a manner as to present their back impedances to said battery source. A voltage divider means having first and second taps thereon is provided across said battery source. The potential appearing at said first tap is supplied to the junction between the first and second diode capacitors of each of said switching means and is of a magnitude and polarity whereby said second diode (in parallel with a crystal) is biased into non-conductivity by a much smaller voltage than the bias voltage applied therebv across said first diode capacitor. Thus, there is produced a high capacitance across said second diode capacitor and a relatively low capacitance across said first diode capacitor so that the crystal diode is effectively short-circuited upon itself while at the same time being isolated from the oscillator circuit by the relatively high reactance of said first diode capacitance. Switching means are provided to supply the potential appearing at said second tap to the common junction between said first and second diode capacitors of any selected switching circuit; the voltage divider being constructed so that the aforementioned potential will produce a relatively small bias across said first diode capacitor and a large bias across said second diode capacitor. Thus, the crystal effectively is connected into said using oscillator circuit through the low impedance of said first capacitor diode.

It is to be understood that when the terms "small capacitance" and "large capacitance" are used in this specification, the real values of such capacitor are relative and depend on several factors. For example, the exact value of such capacitors will depend upon the resonant frequency of the crystal employed. Obviously, the higher the frequency the smaller the reactance a given diode capacitor will have. The controlling criteria is that when it is desired to isolate the crystal from the using oscillator circuit, the series diode capacitor and the parallel diode capacitor must have capacitances which effectively accomplish such isolation. Another important factor is, of course, the degree of isolation desired. In some applications a very high degree of frequency accuracy may be desired. In such applications a high degree of crystal isolation also is desired. Under these circumstances, the capacitance of the series capacitor would have to be smaller and the capacitance of the parallel capacitor would presumably have to be larger than in the instance where a lesser degree of isolation were required in order to meet lesser frequency deviation tolerances. It might be said that the particular magnitude of capacitance existing in the series and parallel diode capacitor is a matter of design for each particular application. The present invention is broader and encompasses the concept of utilizing this type circuit element, one in series and one in parallel with a crystal, and suitable means for biasing such diodes to provide the desired selection and isolation of the various crystals.

The above-mentioned and other objects and features of the invention will be more fully understood from the following detailed description thereof when read in conjunction with the drawing which shows a schematic sketch of one form of the invention.

Referring now to the drawing, there is shown a plurality of what is herein defined as switching circuits. These switching circuits are identified by reference characters 10, 11, 12, 13, and 14, and each switching circuit consists of a crystal and two diode capacitors. For example, the switching circuit 10 consists of crystal 16 and diode capacitors 17 and 21. Similarly, switching circuit 11 consists of crystal 18 and diode capacitors 19 and 22.

The diode capacitors have a characteristic as hereinbefore described wherein if they are biased into a state of non-conductivity by a relatively small voltage, for example, of the order of a tenth of a volt, the capacitance of the diode capacitor is of a certain relatively large value which becomes smaller as the back-bias voltage is increased.

By biasing the two capacitor diodes of any of the switching circuits properly, the crystal diode of that switching circuit can be caused to be connected into the oscillator circuit 41 through the coupling capacitor 52 or, alternatively, the crystal can be caused to become isolated from the oscillator circuit 41. As a specific example of the foregoing statement, assume that the diode 21 in switching circuit 10 has a back-biasing voltage of 50.1 volts thereacross and the diode capacitor 17 has a back-biasing voltage of 0.1 volt thereacross.

Under these conditions the diode capacitor 21 will present a low capacitance and, consequently, a high reactance between the crystal 16 and the oscillator circuit 41. To further insure the isolation of the crystal 16 the diode capacitor 17 will have a large capacitance thereacross due to the relatively small back-biasing potential applied thereto and will effectively short-circuit the crystal 16 upon itself.

On the other hand, if a 0.1 volt back-biasing potential is applied across the diode 21 and a 50.1 volt back-biasing potential is applied across the diode capacitor 17, then the crystal 16 will be effectively coupled into the oscillator circuit 41. Under the conditions just outlined, the capacitance of the diode 21 will be large, resulting in a small reactance, while the capacitance of the diode 17 will be small, resulting in a large reactance across the crystal 16.

It will be apparent that if the two diodes in each of the five switching circuits 10 through 14 are biased properly, that one of the crystals can be coupled into the oscillator circuit 41 and all of the other crystals can be effectively isolated from the oscillator circuit 41.

The means for so biasing the diode capacitors of the various switching circuits will now be described. Battery source 27 which, for purposes of example, assume to be a 50.2 volt battery, has its positive terminal connected to the conductor 42 through inductive choke 28, thus placing a 50.2 volt potential on the cathode of each of the series connected diodes, such as diodes 21 and 22. Battery source 27 is also connected across a voltage divider means consisting of resistor 26, resistor 24, and resistor 23. The values of these resistors are so proportioned that at the tap 43 a potential near the maximum positive potential of a battery 27 will appear, for example, a potential of 50.1 volts. The potential of the tap 44 will be near the maximum negative potential (ground potential) of the battery, as for example, 0.1 volt. It can be seen from the drawing that resistor means are provided to connect the tap 44 to the junction between the two diode capacitors of each of the five switching circuits 10 through 14 shown in the drawing. For example, tap 44 is connected to junction 46 of switching circuit 10 through resistor 48 and resistor 47, and is connected to the junction 49 of switching circuit 11 through resistors 37 and 38. Now, in the absence of any other voltage applied to the switching circuits, the effect of the voltage appearing at tap 44 will be to produce a 0.1 volt potential at the common junction of the two diode capacitors of any given switching circuit. Thus, in switching circuit 10 there will be a back-biasing voltage of 0.1 volt across diode capacitor 17 and a back-biasing voltage of 50.1 volts across the diode capacitor 21. Consequently, the capacitance of the diode 21 will be relatively small and will present a large impedance between crystal 16 and the oscillator circuit 41. On the other hand, the capacitance of diode 17 will be large, thus providing for a virtual short-circuit across the diode 16. As indicated above, this condition will exist in each of the switching circuits 10 through 14 if no other biasing voltage is applied.

Provision is made in the circuit to provide an additional biasing voltage which will effectively reverse the biasing potential across the two diode capacitors of a selected one of the switching circuits. Such reversal occurs by means of the following structure and in the manner described below. As indicated hereinbefore, the potential appearing at the tap 43 in the specific form of the invention shown in the drawing is about 50.1 volts. A swinger arm 36 is arranged to selectively make contact with any one of five contacts 29 through 34. Assume that the swinger arm 36 has been set to make with contact 31, thus applying the 50.1 volt appearing at tap 43 to the junction 49. A circuit may then be traced from battery source 27 through resistor 26, arm 36, contact 31, resistor 37, resistor 23 to ground. Because the value of the resistor 37 is very large compared to the value of resistor 26, almost all of the voltage appearing at tap 43 will appear at point 51 and also at the junction 49 of switching circuit 11. Thus, the back-biasing voltage impressed across the diode capacitor 19 is about 50.1 volts and the back-biasing potential impressed across the capacitor diode 22 is equal to 50.2 volts minus 50.1 volts, or 0.1 volt. Thus, the capacitance across the diode 22 is large and will present a relatively low impedance to the oscillator circuit 41. On the other hand, the capacitance across the diode capacitor 19 is comparatively very small and will provide a relatively high reactance across the crystal 18. Therefore, it can be seen that with the swinger arm 36 connected to the contact 31, the crystal 18 is connected into the oscillator circuit 41 and all of the other crystal circuits are effectively isolated from the oscillator circuit 41.

Specific values of circuit components employed in one specific design of the invention of the form shown in the figure are as follows:

| Component | Value |
|---|---|
| R23 | 100 ohms. |
| R24 | 50K. |
| R26 | 100 ohms. |
| R37 | 470K. |
| R38 | 470K. |
| R47 | 470K. |
| R48 | 470K. |
| R53 | 470K. |
| R54 | 470K. |
| R55 | 470K. |
| R56 | 470K. |
| R57 | 470K. |
| R58 | 470K. |
| C52 | 1000 microfarad. |
| L28 | 1 mh. |

All of the diode capacitors may be of the type HC–7004, manufactured by Hughes Aircraft Co. The crystals may be of series resonant type and may have a frequency range 1–100 mc.

It is to be understood that the form of the invention shown and described herein is but one preferred embodiment thereof, and that many combinations of values of circuit components and variations in circuit arrangement may be made without departing from the spirit or scope of the invention.

We claim:

1. A selective switching system for selecting one of a plurality of first circuit means, said selective switching systems comprising a voltage source, a plurality of switching circuits connected in parallel with each other with respect to said voltage source, and operating means for selectively switching any of said switching circuits, each of said switching circuits comprising second circuit means including a first diode capacitor means connected in series with one of said first circuit means, and third circuit means including a second diode capacitor means connected in parallel with said first circuit means, said first and second diode capacitor means polarized to present their high back impedances to said voltage source, said operating means comprising isolating means for supplying to the junctions between said second and third circuit means a first potential of a magnitude to provide a large back-biasing voltage across each of said first diode capacitor means and a small back-biasing voltage across each of said second diode capacitor means, said operating means further comprising selecting means for supplying to the said junction of a selected one of said switching circuits a second potential of a magnitude to provide a small back-biasing potential across the first diode capacitor means and a large back-biasing potential across the second diode capacitor means of the selected one of said switching circuits.

2. A selective system in accordance with claim 1 in which said isolating means comprises a voltage divider means having a first tap thereon, and first connecting means for connecting said first tap to said junctions, and in which said selecting means comprises a second tap on said voltage divider means and second connecting means for connecting said second tap to the junction of the selected one of said switching circuits, said first connecting means and said voltage divider being constructed to cooperate to supply to said junctions said first potential, and said second connecting means and said voltage divider means being constructed to supply said second potential to the junction of the selected one of said switching circuits.

3. A selective switching system in accordance with claim 2 in which said second connecting means comprises a plurality of stationary contacts, means for connecting individual ones of said stationary contacts to individual ones of said junctions of said switching circuits, and movable contact means constructed to connect said second tap to any selected one of said stationary contacts.

4. A selective switching system for selecting one of a plurality of circuit means, said selective switching system comprising voltage source means, a plurality of switching circuits connected in parallel with each other with respect to said voltage source means, each of said switching circuits comprising a first diode capacitor means connected in series with said circuit means and second diode capacitor means connected in parallel with said circuit means, said first and second diode capacitor means polarized to present their high back impedances to said voltage source means, isolating means for supplying to the junction between said first and second diode capacitor means of each switching circuit a first potential to provide a large back-biasing voltage across each of said first diode capacitor means and to provide a small back-biasing voltage across each of said second diode capacitor means and selecting means for supplying to the junction of a selected one of said switching means a second potential of a magnitude to cause a small back-biasing potential across the first diode capacitor means and a large back-biasing potential across the second diode capacitor means of said selected switching circuit.

5. A selective switching system in accordance with claim 4 in which said isolating means comprises a voltage divider means having a first tap thereon, and first connecting means for connecting said first tap to said junctions, and in which said selecting means comprises a second tap on said voltage divider means and second connecting means for connecting said second tap to the junction of the selected one of said switching circuits, said first connecting means and said voltage divider being constructed to cooperate to supply to said junctions said first potential, and said second connecting means and said voltage divider means being constructed to supply said second potential to the junction of the selected one of said switching circuits.

6. A selective switching system in accordance with claim 5 in which said second connecting means comprises a plurality of stationary contacts, means for connecting individual ones of said stationary contacts to the junctions between the first and second diode capacitors of each of said switching circuits, and movable contact means constructed to selectively connect said second tap to any of said stationary contacts.

References Cited by the Examiner

UNITED STATES PATENTS

| | | | |
|---|---|---|---|
| 2,553,366 | 5/51 | Fry | 310—8.1 |
| 2,735,940 | 2/56 | Norby | 331—161 |
| 3,020,421 | 2/62 | Craiglow | 331—161 X |

OTHER REFERENCES

Circuit Design Using Silicon Capacitors by J. Hamerslag; "Electronics," Sept. 18, 1959, pages 48–50.

HERMAN KARL SAALBACH, *Primary Examiner.*

SAMUEL B. PRITCHARD, *Examiner.*